3,400,123
PROCESS FOR PREPARING 8β-METHYL-11β-HYDROXYSTEROIDS
Wataru Nagata, Nishinomiya-shi, Tetsuo Tomita, Kyoto-shi, and Hiroshi Itazaki, Nishinomiya-shi, Japan, assignors to Shionogi & Co., Ltd., Osaka, Japan
No Drawing. Continuation of application Ser. No. 529,673, Feb. 24, 1966. This application Aug. 15, 1967, Ser. No. 661,763
Claims priority, application Japan, Aug. 24, 1962, 37/36,531, 37/36,532, 37/36,533, 37/36,534
26 Claims. (Cl. 260—239.55)

ABSTRACT OF THE DISCLOSURE

A generally applicable process is provided for the preparation of 8β-methyl-11β-hydroxysteroid from 8β-cyano-11β-hydroxysteroid. The latter is first lactonized, the resulting carboimidic acid lactone is then acylated, the resultant N-acyl-carboimidic acid lactone is subjected to reductive fission of the lactone linkage, the obtained 8β-iminomethyl-11β-hydroxysteroid is hydrolyzed to the 8β-formyl-11β-hydroxysteroid, and the latter is reduced to the objective 8β-methyl-11β-hydroxysteroid. A number of novel intermediates are obtained. The novel final products, such e.g. as 8-methyl-17β-hydroxy-4-androsten-3-one, are useful as anabolic agents.

The present invention relates to a process for preparing 8β-methyl-11β-hydroxysteroids. More particularly, it relates to a generally applicable process for converting 8β-cyano-11β-hydroxysteroids into 8β-methyl-11β-hydroxysteroids.

This application is a continuation of copending application, Ser. No. 529,673, filed Feb. 24, 1966, as a continuation-in-part of application, Ser. No. 301,668, filed Aug. 12, 1963 (both now abandoned).

The present process is illustratively shown by the following scheme:

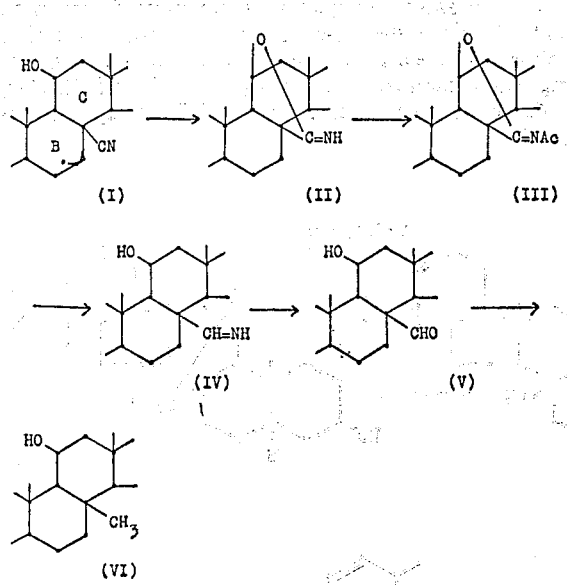

wherein Ac is an acyl group such as lower alkanoyl (e.g. acetyl, propionyl, butyryl, valeryl), aryloyl (e.g. benzoyl, toluoyl), lower alkoxycarbonyl (e.g. methoxycarbonyl, ethoxycarbonyl) and aryloxycarbonyl (e.g. phenoxycarbonyl, tolyloxycarbonyl).

As shown in the above scheme, the present process substantially comprises 5 steps, i.e. (1) lactonization of the starting 8β-cyano-11β-hydroxysteroid (I), (2) acylation of the resulting carboimidic acid lactone (II), (3) reductive fission of the resultant N-acylcarboimidic acid lactone (III), (4) hydrolysis of the resulting 8β-iminomethyl-11β-hydroxysteroid (IV) and (5) reduction of the resultant 8β-formyl-11β-hydroxysteroid (V) to the objective 8β-methyl-11β-hydroxysteroid (VI).

The starting material of the present process is an 8β-cyano-11β-hydroxysteroid (I) which may belong to any one of the steroid series including androstane, pregnane, cholane, cholestane, sitostane, ergostane and spirostane. Apart from those mentioned above, the starting material may contain further substituents such as free or functionally converted hydroxyl, oxo or carbonyl groups and they may also contain double bonds. The 8β-cyano-11β-hydroxysteroid (I) can be generally produced by treating a 9α-halogeno-11-oxosteroid with a basic agent such as pyridine, picoline, dimethylaniline, calcium carbonate in dimethylformamide, lithium chloride in dimethylformamide and lithium carbonate in dimethylformamide while refluxing, treating the resultant Δ8(9)-11-oxosteroid with hydrocyanic acid and tri(lower)alkyl aluminum such as triethyl aluminum, tripropyl aluminum and tributyl aluminum in an inert organic solvent such as tetrahydrofuran, dioxane, ether and benzene at room temperature (15 to 30° C.) and treating the resulting 8β-cyano-11-oxosteroid with a metal hydride such as sodium borohydride and lithium borohydride in an inert organic solvent such as tetrahydrofuran, dioxane and ether at a temperature from room temperature (15 to 30° C.) to reflux temperature.

According to the process of the present invention, the starting 8β-cyano-11β-hydroxysteroid (I) is first subjected to lactonization. The lactonization is accomplished by treating the 8β-cyano-11β-hydroxysteroid (I) with an acid at a wide range of temperature from room temperature (15 to 30° C.) to reflux temperature preferably in an inert solvent such as ether, dioxane, tetrahydrofuran, methanol and ethanol. As the acid, there may be employed not only an ordinary organic or inorganic acid such as p-toluenesulfonic acid, hydrochloric acid and sulfuric acid but also a Lewis acid such as boron fluoride and aluminum chloride.

The resultant carboimidic acid lactone (II) is then subjected to acylation. Hereupon, the term "acylation" may be understood in a relatively wide sense and intended to mean the introduction of an acyl group such as lower alkanoyl (e.g. acetyl, propionyl, butyryl), aryloyl (e.g. benzoyl, toluoyl), lower alkoxycarbonyl (e.g. ethoxycarbonyl, propoxycarbonyl, butoxycarbonyl) and aryloxycarbonyl (e.g. phenoxycarbonyl, tolyloxycarbonyl) into the N-position of the carboimidic acid lactone (II). The acylation may be attained by a per se conventional procedure. For instance, the reaction proceeds by treating the carboimidic acid lactone (II) with an acylating agent such as acid anhydride and acid halide in the presence of a base such as pyridine, picoline and dimethylaniline at a temperature from room temperature (15 to 30° C.) to reflux temperature. The present acylating can be accomplished easily irrespective of the kind of the acyl group in the employed acylating agent. As, however, the reaction procedure in the subsequent reductive fission step is required to be more or less changed according to the kind of the said acyl group, selection of a suitable acylating agent in this acylation step should be made in consideration of the whole structure of the carboimidic acid lactone (II). In general, it is preferred to use the acylating agent of which the acyl group is lower alkanoyl or lower alkoxycarbonyl.

The resulting N-acylcarboimidic acid lactone (III) is then subjected to reductive fission of lactone linkage. The reductive fission may be carried out by a per se conventional procedure, so-called "Birch reduction," i.e. treating the N-acylcarboimidic acid lactone (III) with alkali metal or alkaline earth metal such as lithium, sodium, potassium and calcium in liquid ammonia or an organic base such as dimethylamine and diethylamine in the presence or absence of a proton source such as methanol, ethanol, propanol and t-butanol at a relatively low temperature (e.g. 0 to −100° C.), if necessary, followed by hydrolysis. The acyl group at the N-position of the N-acylcarboimidic acid lactone (III) is generally preferred to be lower alkanoyl and, in such case, the reductive fission can be attained by Birch reduction in the presence of a proton source without the subsequent hydrolysis to give the 8β-iminomethyl-11β-hydroxysteroid (IV) in a good yield. When the C—O juncture of the lactone linkage has a large strain caused by, for instance, a double bond present between the 5- and 6-positions, the 8β-iminomethyl-11β-hydroxysteroid (IV) is produced only in a poor yield by the application of the same Birch reduction procedure as above to the N-acylcarboimidic acid lactone (III) wherein the acyl group is lower alkanoly. In such case, the use of the N-acylcarboimidic acid lactone (III) in which the acyl group is lower alkoxycarbonyl is preferred. Thus, it is subjected to Birch reduction in the absence of a proton source, followed by hydrolysis of the resulting dihydro derivative represented by the partial formula:

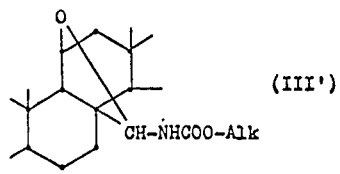

(III′)

wherein Alk is a lower alkyl group (e.g. methyl, ethyl, propyl, butyl) to give the 8β-iminomethyl-11β-hydroxysteroid (IV) in a good yield. The hydrolysis of the dihydro derivative (III′) can be realized by treatment with an alkali, e.g. treatment with alkali hydroxide such as sodium hydroxide and potassium hydroxide in a lower alkanol such as methanol, ethanol and propanol at a temperature from room temperature (15 to 30° C.) to reflux temperature. In this connection, it should be noted that the above mentioned acylation step at the N-position is indispensable for successful accomplishment of the present reductive fission, because when the carboimidic acid lactone (II) is subjected to Birch reduction not the 8β-iminomethyl-11β-hydroxysteroid (IV) but the 8β-cyano-11β-hydroxysteroid (I) is produced.

The resultant 8β-iminomethyl-11β-hydroxysteroid (IV) is then subjected to hydrolysis. The hydrolysis may be carried out by treating the 8β-iminomethyl-11β-hydroxysteroid (IV) with an acid such as hydrochloric acid, sulfuric acid and nitric acid or a base such as sodium hydroxide and calcium hydroxide at a temperature from room temperature (15 to 30° C.) to reflux temperature. In general, the choice of acidic hydrolysis is preferred. The same object can be attained by treatment of the 8β-iminomethyl-11β-hydroxysteroid (IV) with nitrous acid or metal oxide such as alumina and magnesia, although the use of these reagents do not seem to cause the reaction which is within the category of "hydrolysis" in an ordinary sense.

The resulting 8β-formyl-11β-hydroxysteroid (V) is then subjected to reduction. The reduction may be accomplished by a per se conventional procedure, so-called "Wolff-Kishner reduction" or its modification method such as so-called "Huang-Minlon reduction." For instance, the reaction is executed by treating the 8β-formyl-11β-hydroxysteroid (V) with hydrazine in a lower alkanol such as methanol, ethanol, propanol, diethyleneglycol and triethyleneglycol, followed by decomposition of the resultant hydrazone with a basic substance such as sodium methoxide, sodium ethoxide, sodium hydroxide and potassium hydroxide.

Alternatively, the 8β-iminomethyl-11β-hydroxysteroid (IV) may be conveniently converted into the 8β-methyl-11β-hydroxysteroid (VI) in one step by application of the above mentioned Wolff-Kishner reduction procedure to the former.

Although the process of the present invention is hereinbefore illustrated step by step, some of these steps may be executed succesively without the isolation of the product in each step.

The final product, the 8β-methyl-11β-hydroxysteroid (VI), is useful as an intermediate in the synthesis of steroids having pharmacological activity such as anabolic activity.

The following examples illustrate presently-preferred embodiments of the present invention. In these examples, abbreviations each has the conventional meaning, e.g. mg.=milligram(s), g.=gram(s), ml.=millilitre(s), ° C.=degrees contigrade, Anal. Calcd.=analysis calculated, etc.

Example 1

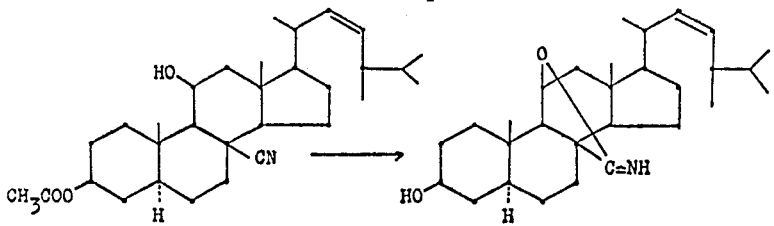

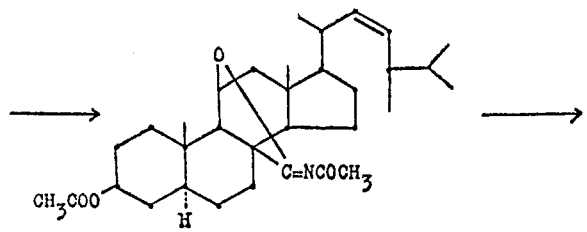

Example 1.—Cont.

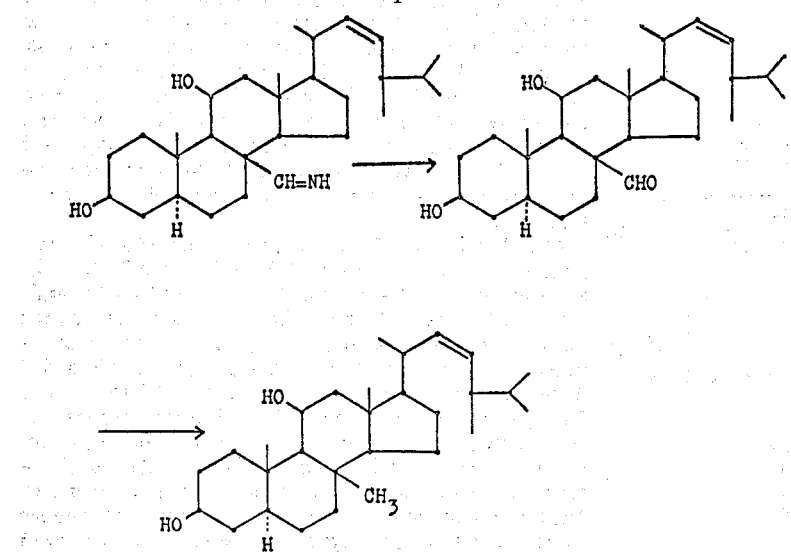

(A) A solution of 3β-acetyloxy-11β-hydroxy-5α-22-ergostene-8-carbonitrile (250 mg.) in a mixture of 95% ethanol (25 ml.) and 36% hydrochloric acid (2.5 ml.) is heated for 3 hours while refluxing in nitrogen stream. After cooling, the reaction mixture is combined with water and shaken with chloroform. The chloroform layer is washed with a dilute aqueous solution of sodium carbonate and then water, dried over anhydrous sodium sulfate and evaporated under reduced pressure. The residue (252 mg.) is crystallized from a mixture of acetone and pentane to give 3β,11β - dihydroxy-5α-22-ergostene-8-carboimidic acid 8,11-lactone (213 mg.) as crystals melting at 170.5 to 171.5° C.

(B) A solution of 3β,11β-dihydroxy-5α-22-ergostene-8-carboimidic acid 8,11-lactone (80 mg.) in a mixture of pyridine (0.8 ml.) and acetic anhydride (0.6 ml.) is allowed to stand at room temperature (15 to 30° C.) for 19 hours. The reaction mixture is combined with ice-water and shaken with ether. The ether layer is washed with 2 N hydrochloric acid, water, 2 N sodium carbonate and water in turn, dried over anhydrous sodium sulfate and evaporated under reduced pressure. The residue (97 mg.) is crystallized from methanol to give N-acetyl-3β-acetyloxy-11β-hydroxy-5α-22-ergostene-8-carboimidic acid 8,11-lactone (72 mg.) as crystals melting at 153 to 154.5° C.

(C) A solution of N-acetyl-3β-acetyloxy-11β-hydroxy-5α-22-ergostene-8-carboimidic acid 8,11-lactone (1.1 g.) in a mixture of anhydrous tetrahydrofuran (13.8 ml.) and anhydrous tertiary butanol (13.8 ml.) is dropwise added to a solution of metallic lithium (560 mg.) in liquid ammonia (34 ml) at −45 to −50° C. while stirring in about 12 minutes. Stirring is further continued for 4 hours at the same temperature. Ammonium chloride is added to the reaction mixture until the blue colour of metallic lithium disappears. After evaporation of ammonia at room temperature (15 to 30° C.), the residue is combined with water and shaken with chloroform. The chloroform layer is washed with water, dried over anhydrous sodium sulfate and evaporated. The resultant crude crystals (1.1 g.) are fractionally recrystallized from a mixture of chloroform and methanol to give 8-iminomethyl-5α-22-ergostene-3β,11β-diol (390 mg.) as crystals melting at 183 to 185° C., 8 - acetamidomethyl-5α-22-ergostene-3β,11β-diol (67 mg.) as crystals melting at 289 to 291° C. and an amorphous substance (633 mg.). The amorphous substance is chromatographed on alumina (15 g.). 8-iminomethyl-5α-22-ergostene-3β,11β-diol (216 mg.) and 8-acetamidomethyl-5α-22-ergostene-3β,11β-diol (197 mg.) are additionally obtained from the eluate with benzene-chloroform (1:1) and the eluate with benzene-chloroform (1:2) to chloroform-methanol (99:1), respectively.

(D) To a mixture of 8-iminomethyl-5α-22-ergostene-3β,11β-diol (196 mg.), sodium nitrite (635 mg.), sodium acetate (635 mg.), dioxane (59 ml.) and water (4 ml.), there is dropwise added a mixture of glacial acetic acid (2.1 ml.) and dioxane (43 ml.) at room temperature (15 to 30° C.) in about 1 hour while stirring in nitrogen stream, and the resultant mixture is allowed to stand overnight. The reaction mixture is combined with ice-water and shaken with chloroform. The chloroform layer is washed with 2 N sodium carbonate and water, dried over anhydrous sodium sulfate and evaporated under reduced pressure. The crystalline residue is crystallized from a mixture of chloroform and methanol to give 3β,11β-dihydroxy-5α-22-ergostene - 8 - carboxaldehyde (130 mg.) as crystals melting at 238 to 240° C.

(E) 3β,11β - dihydroxy-5α-22-ergostene-8-carboxaldehyde (100 mg.) is added to a mixture of potassium hydroxide (110 mg.), hydrazine hydrate (0.2 ml.) and triethyleneglycol (4 ml.), and the resultant mixture is heated at 130° C. for 30 minutes and then up to 210° C. in 45 minutes. Heating is continued for 2.5 hours at the same temperature. After cooling, the reaction mixture is shaken with chloroform. The chloroform extract is shaken with 2 N hydrochloric acid, water, 5% sodium bicarbonate and water in turn, dried over anhydrous sodium sulfate and evaporated under reduced pressure. The resultant powder (99 mg.) is crystallized from a mixture of ether and pentane to give 3β,11β-dihydroxy-5α-22-ergostene-8-methanol (27 mg.) as crystals melting at 229 to 231° C. The crystallization mother liquor is evaporated and crystallized from methanol to give 8-methyl-5α-22-ergostene-3β,11β-diol (49 mg.) as crystals metling at 156 to 158.5° C.

The starting material of this example, 3β-acetyloxy-11β-hydroxy-5α-22-ergostene-8-carbonitrile, is prepared from 3β - acetyloxy-5α-8,22-ergostadien-11-one [Schoenewaldt et al.: J. Am. Chem. Soc., vol. 74, p. 2696 (1952)] according to the following scheme:

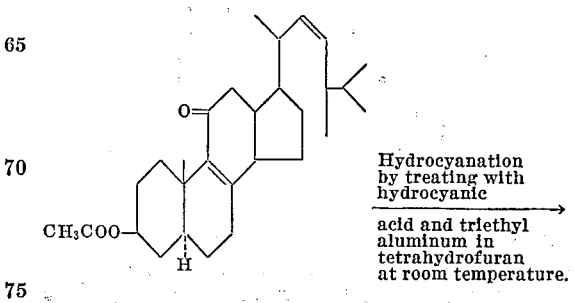

Hydrocyanation by treating with hydrocyanic acid and triethyl aluminum in tetrahydrofuran at room temperature.

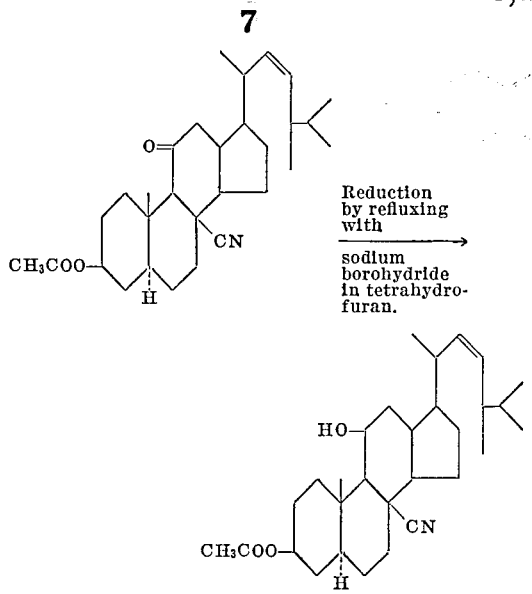

is dropwise added a solution of p-toluenesulfonic acid (500 mg.) in anhydrous benzene (100 ml.) in 1 hour, and the benzene is gradually distilled out whereby the whole is made to 30 to 40 ml. in 2 hours. After cooling, the reaction mixture is combined with 2 N sodium carbonate and shaken with ether. The ether layer is washed with water, dried over anhydrous sodium sulfate and evaporated under reduced pressure to give 3,3,17,17-bisethylenedioxy-11β-hydroxy-5-androstene-8-carboimidic acid 8,11-lactone (1.11 g.).

(B) A mixture of anhydrous pyridine (40 ml.) and ethyl chlorocarbonate (4 ml.) is added to 3,3,17,17-bisethylenedioxy - 11β - hydroxy-5-androstene-8-carboimidic acid 8,11-lactone (1.11 g.) while cooling with ice, and the resutlant mixture is stirred for 3 hours at room temperature (15 to 30° C.). A small amount of water is added thereto and stirred at room temperature (15 to 30° C.) for 2 hours whereby excess of ethyl chlorocarbonate is decomposed. The reaction mixture is combined with ice-water and shaken with dichloromethane. The dichloromethane layer is washed with sodium carbonate and water, dried over anhydrous sodium sulfate and evaporated under reduced pressure. The crystalline residue is recrystallized from methanol to give 3,3,17,17 - bisethylenedioxy-N-

Example 2

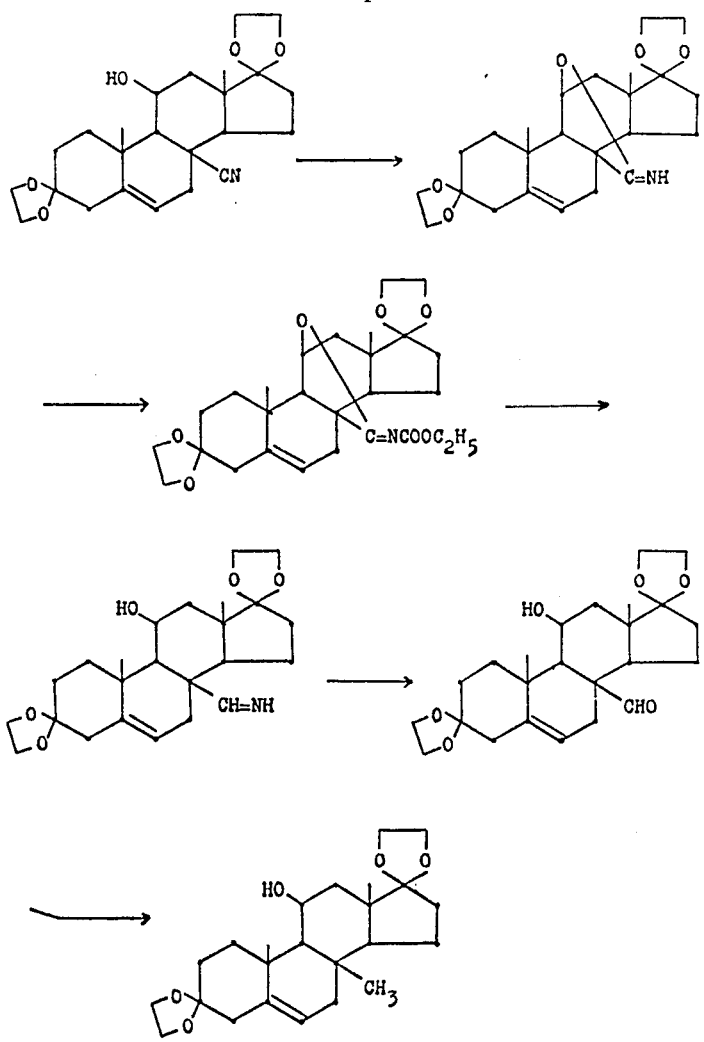

(A) To a mixture of 3,3,17,17 - bisethylenedioxy-11β-hydroxy - 5-androstene-8-carbonitrile (1 g.) and ethyleneglycol (450 mg.) in anhydrous benzene (100 ml.), there ethoxycarbonyl - 11β-hydroxy-5-androstene-8-carboimidic acid 8,11-lactone (796.8 mg.) as crystals melting at 210 to 212° C.

(C) To a mixture of 3,3,17,17-bisethylenedioxy-N-ethoxycarbonyl - 11β-hydroxy-5-androstene-8-carboimidic acid 8,11-lactone (1 g.) and anhydrous tetrahydrofuran (50 ml.) in liquid ammonia (150 ml.), there is added metallic lithium (127 mg.) portion-wise at −70 to −75° C. while stirring in 20 minutes. After further stirring for 20 minutes, ammonium chloride is added to the reaction mixture for inactivation of excess of lithium. Evaporating liquid ammonia, the resultant mixture is combined with water and shaken with chloroform. The chloroform layer is washed with water, dried over anhydrous sodium sulfate and evaporated under reduced pressure. The resulting product (1.17 g.) is combined with a mixture of 95% ethanol (80 ml.), water (40 ml.) and potassium hydroxide (12 g.) and refluxed for 5 hours in nitrogen stream. After evaporation of the solvent under reduced pressure, the resultant mixture is combined with water and shaken with chloroform. The chloroform layer is washed with water, dried over anhydrous sodium sulfate and evaporated under reduced pressure. The residue is crystallized from ether to give 3,3,17,17-bisethylenedioxy-8-iminomethyl-5-andosten-11β-ol (960 mg.) as crystals melting at 175 to 185° C.

(D) 3,3,17,17 - bisethylenedioxy-8-iminomethyl-5-androsten-11β-ol (300 mg.) is chromatographed on alumina (8 g.) using benzene as a solvent and allowed to stand at room temperature (15 to 30° C.) for 4 days. The eluate with benzene to benzene-chloroform (4:1) is evaporated and the residue crystallized from a mixture of dichloromethane and ether to give 3,3,17,17-bisethylenedioxy - 11β - hydroxy-5-androstene-8-carboxaldehyde (66 mg.) as crystals melting at 250 to 252° C.

(E) 3,3,17,17 - bisethylenedioxy-11β-hydroxy-5-androstene-8-carboxaldehyde (50 mg.) is combined with potassium hydroxide (60 mg.), hydrazine hydrate (0.1 ml.) and triethyleneglycol (2 ml.), and the resultant mixture is heated at 125° C. for 40 minutes and then up to 210° C. in 50 minutes. Heating is continued for 3 hours at the same temperature. After cooling, the reaction mixture is shaken with chloroform. The chloroform extract is shaken with 2 N hydrochloric acid, water, 5% sodium bicarbonate and water in turn, dried over anhydrous sodium sulfate and evaporated under reduced pressure. The residue is crystallized from methanol to give 3,3,17,17-bisethylenedioxy-8-methyl-5-androsten-11β-ol (18 mg.) as crystals melting at 197 to 200° C.

The starting material of this example, 3,3,17,17-bisethylenedioxy-11β-hydroxy5-androsten-8-carbonitrile, is prepared from 9α-bromo-11β-hydroxy-4-androstene-3,17-dione [Lenhard et al.: J. Am. Chem., Soc., vol. 77, p. 6665 (1955)] according to the following scheme:

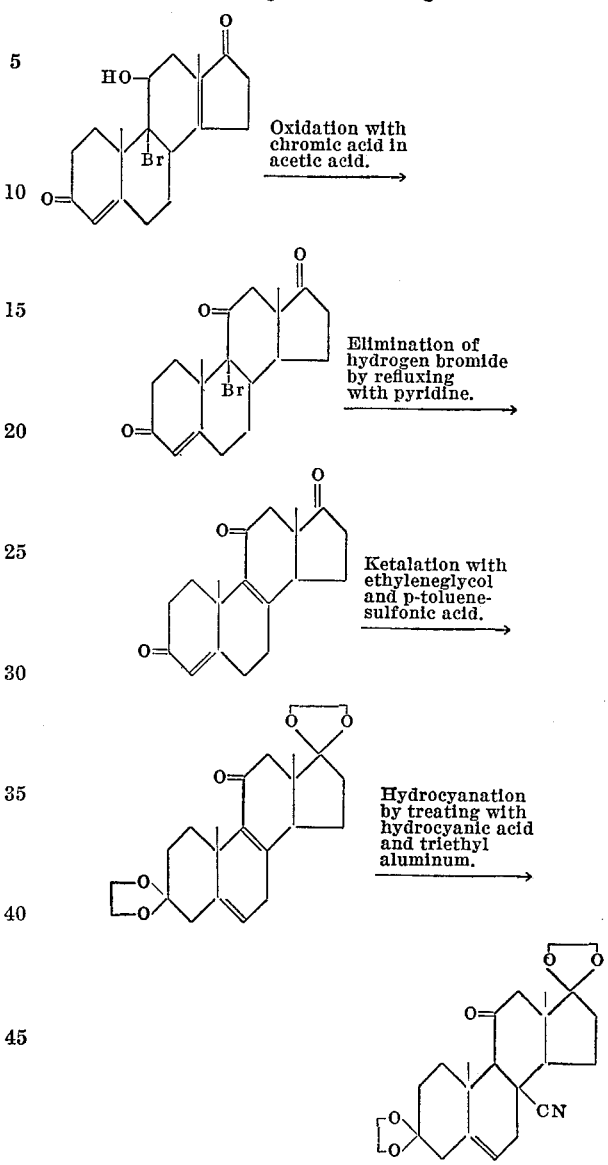

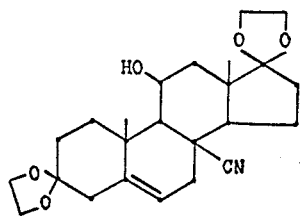

Example 3.

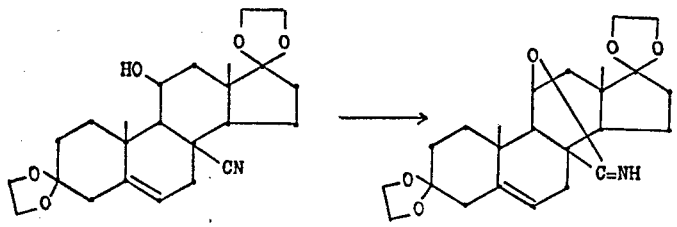

Example 3.—Contd.

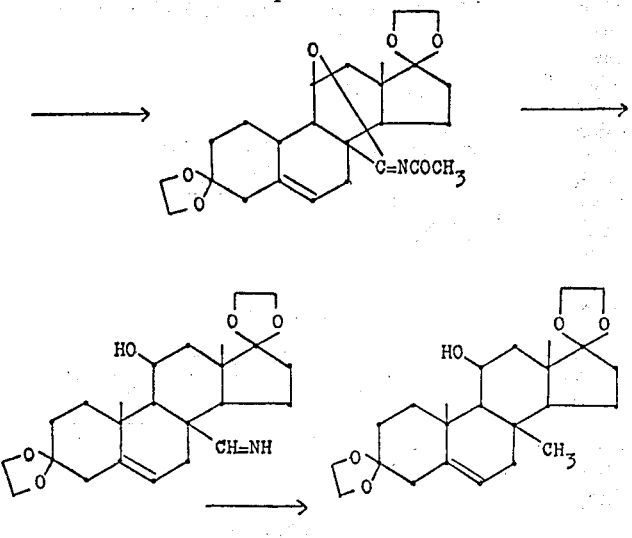

(A) To a mixture of 3,3,17,17-bisethylenedioxy-11β-hydroxy-5-androstene-8-carbonitrile (520 mg.) and ethyleneglycol (235 mg.) in anhydrous benzene (40 ml.), there is dropwise added a solution of p-toluenesulfonic acid (259 mg.) in anhydrous benzene (20 ml.) in 30 minutes, and the benzene is gradually distilled out whereby the whole is made to 15 to 20 ml. in 1.5 hours. After cooling, the reaction mixture is combined with 2 N sodium carbonate and shaken with ether. The ether layer is washed with water, dried over anhydrous sodium sulfate and evaporated under reduced pressure to give 3,3,17,17-bisethylenedioxy - 11β - hydroxy-5-androstene-8-carboimidic acid 8,11-lactone (540 mg.).

(B) A mixture of anhydrous pyridine (10 ml.) and acetic andhydride (3 ml.) is added to 3,3,17,17-bisethylenedioxy-11β-hydroxy-5-androstene - 8 - carboimidic acid 8,11-lactone (540 mg.), and the resultant mixture is allowed to stand at room temperature (15 to 30° C.) overnight. The reaction mixture is combined with ice water and then 2 N sodium carbonate and shaken with chloroform. The chloroform layer is washed with water, dried over anhydrous sodium sulfate and evaporated under reduced pressure. The crystalline residue (580 mg.) is recrystallized from methanol to give 3,3,17,17-bisethylenedioxy-N-acetyl - 11β-hydroxy-5-androstene-8-carboimidic acid 8,11-lactone (394 mg.) as crystals melting at 209 to 211° C.

(C) To a mixture of 3,3,17,17 - bisethylenedioxy-N-acetyl-11β-hydroxy-5-androstene-8-carboimidic acid 8,11-lactone (200 mg.) in anhydrous tetrahydrofuran (2.5 ml.), anhydrous tertiary butanol (2.5 ml.) and liquid ammonia (6 ml.), there is added metallic lithium (100 mg.) at −35 to −42° C. in 10 minutes, and the resultant mixture is stirred for 2 hours. The reaction mixture is combined with ammonium chloride whereby the blue colour of metallic lithium disappears. After evaporation of liquid ammonia, water is added thereto. The resulting mixture is shaken with chloroform. The chloroform layer is washed with water, dried over anhydrous sodium sulfate and evaporated under reduced pressure. The residue (184 mg.) is chromatographed on alumina (8 g.). The eluate with benzene-chloroform (4:1) is evaporated and crystallized from ether to give 3,3,17,17-bisethylenedioxy-8-iminomethyl-5-androsten-11β-ol (24.9 mg.) as crystals melting at 175 to 185° C. The eluate with benzene-chloroform (2:1–1:1) is crystallized from ether to give 3,3,17,17 - bisethylenedioxy-8-acetamidomethyl-5-androsten-11β-ol (30.3 mg.) as crystals melting at 233 to 235° C.

(D) To 3,3,17,17 - bisethylenedioxy-8-iminomethyl-5-androsten-11β-ol (960 mg.), potassium hydroxide (1.1 g.), 80% hydrazine hydrate (6 ml.) and triethyleneglycol (40 ml.) are added, and the resultant mixture is heated at 130° C. for 30 minutes. Then, the mixture is heated up to 210° C. in 45 minutes and heating is continued at the same temperature for 2.5 hours. After cooling, the reaction mixture is combined with ice water and shaken with chloroform. The chloroform layer is washed with water, dried over anhydrous sodium sulfate and evaporated under reduced pressure. The residue (960 mg.) is dissolved in chloroform and shaken with 10% tartaric acid. The chloroform layer is washed with 2 N sodium carbonate and water, dried over anhydrous sodium sulfate and evaporated under reduced pressure. The crystalline residue (460 mg.) is recrystallized from methanol to give 3,3,17,17-bisethylenedioxy-8-methyl-5-androsten - 11β - ol (351 mg.) as crystals melting at 197 to 200° C.

The 8β - methyl-11β-hydroxysteroids prepared by the process of the present invention are generally useful as intermediates in the synthesis of artificial hormonic substances. For instance, 3,3,17,17 - bisethylenedioxy - 8-methyl-5-androsten-11β-ol prepared as in the above Example 2 can be converted into various 8-methyl-androstanes which are per se useful as anabolic agents according to the following scheme:

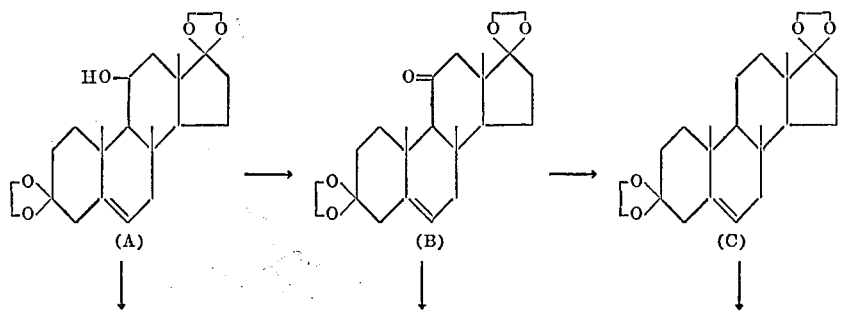

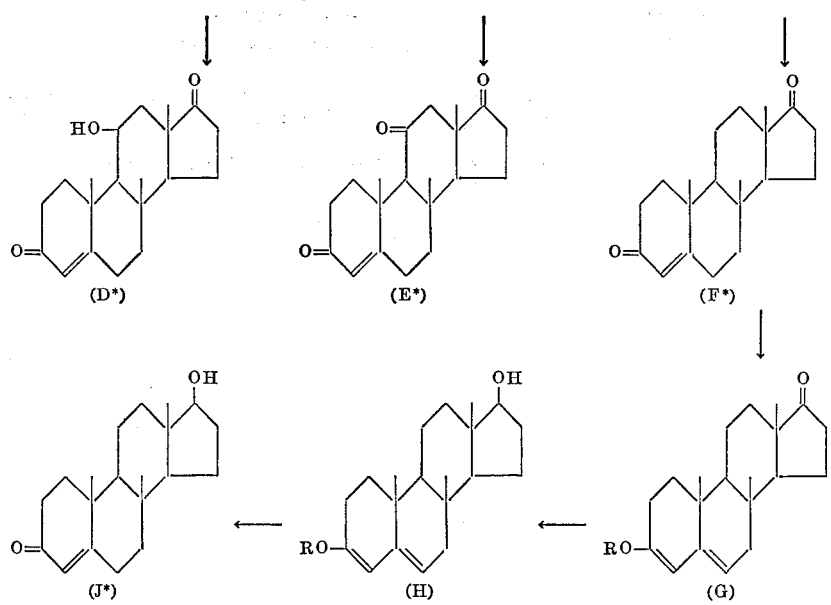

wherein R is a lower alkyl group (e.g. methyl, ethyl, propyl, butyl) and an asterisk (*) indicates anabolic activity.

pecially made preparation for parenteral administration, preferably solutions, above all oily or aqueous solutions, furthermore suspensions, emulsions or implants, for en-

TABLE I

| Sample | Testosterone Propionate | | | Oxymetholone | | | Compound J | | |
|---|---|---|---|---|---|---|---|---|---|
| | Control | Test | | Control | Test | | Control | Test | |
| Treatment Symbol | A | B | (B-A)/A | A | B | (B-A)/A | A | B | (B-A)/A |
| Number of rates | 10 | 9 | | 10 | 9 | | 8 | 10 | |
| Initial body weight | 137.9 | 136.7 | | 137.9 | 140.1 | | 126.8 | 129.5 | |
| Final body weight | 162.0 | 168.1 | | 162.0 | 168.3 | | 143.4 | 143.1 | |
| Seminal Vesicle | 23.0 | 324.7 | 1311.1 | 23.0 | 106.4 | 362.4 | 40.3 | 43.7 | 8.5 |
| Ventral Prostate | 14.2 | 258.1 | 1716.3 | 14.2 | 103.1 | 625.5 | 16.0 | 18.3 | 14.2 |
| Levator Ani Muscle | 31.0 | 95.9 | 208.9 | 31.0 | 85.9 | 176.6 | 29.7 | 41.9 | 41.1 |
| L.A.M./S.V. | | | 0.159 | | | 0.486 | | | 4.84 |
| L.A.M./V.P. | | | 0.122 | | | 0.281 | | | 2.89 |
| L.A.M./S.V. ratio (T.P.=1) | | | 1 | | | 3.05 | | | 30.4 |
| L.A.M./V.P. ratio (T.P.=1) | | | 1 | | | 2.30 | | | 23.7 |

For instance, the compound J has selective anabolic activity as confirmed by the comparative bioassay on castrated adult male rats weighing about 130–140 g. The compound J, testosterone propionate (a standard androgenic and anabolic agent) and oxymetholone (a well-known representative of so-called anabolic agent) were respectively administered subcutaneously for consecutive 10 days at the dose of 1 mg. per a day per rat and the end points (weights of Seminal Vesicle, Ventral Prostate and Levator Ani Muscle) were determined at the 11th day by autopsy. The results of this assay designed with each group consisted of 8 to 10 rats are summarized in the Table I, wherein body weights are represented by gram unit and organ weights by milligram unit. The last two lines clearly show that the compound J has much higher anabolic/androgenic ratio (about 24–30 times than T.P.) than oxymetholone (about 2.3–3.1 times than T.P.), to say nothing of testosterone propionate, of which activity has been well established as not lower than that of testosterone, des-8β-methyl derivative of the compound J.

The compounds asterisked as above, especially the compound J can be used in human or veterinary medicine solely or in combination or in preparation in conjunction with a solid or liquid pharmaceutical excipient. The preparations are prepared by as such known methods, for example, with the use of pharmaceutical organic or inorganic excipients suitable for parenteral, enteral or local administration. Suitable excipients are substances that do not react with the products of the present invention such, for example, as water, vegetable oils, benzyl alcohols, polyethylene glycols, gelatin, lactose, starches, magnesium stearate, talc, white petroleum jelly, isopropyl myristate or other known pharmaceutical excipients. There are esteral administration there are similarly also made tablets or dragees, and for local administration also ointments or creams. If desired, auxiliaries may be added thereto, such as preserving, stabilizing, wetting or emulsifying agents, salts for regulating the osmotic pressure, or buffers. They may also contain other therapeutically useful substances. The preparations are obtained in the customary way. The content of active compound in these preparation, such as of a tablet or an ampoule, is preferably 0.5 to 200 mg. or 0.05 to 60%. The average dose for human adult is preferably 10 to 500 mg./week.

The above conversion will be hereinafter illustrated concretely by examples. In these examples, abbreviations each has the conventional meaning as above mentioned.

Example A

Preparation of 8 - methyl-11β-hydroxy-4-androstene-3, 17-dione from 3,3,17,17-bisethylenedioxy-8-methyl-5-androsten-11β-ol: To a solution of 3,3,17,17-bisethylenedioxy-8-methyl-5-androsten-11β-ol (248 mg.) in glacial acetic acid (3 ml.), there is added water (1.3 ml.), and the resultant mixture is heated on a steam bath for 40 minutes. After evaporation of acetic acid and water under reduced pressure, the reaction mixture is combined with ice water and shaken with dichloromethane. The dichloromethane layer is washed with 2 N sodium carbonate and water, dried over anhydrous sodium sulfate and evaporated under reduced pressure. The residue is crystallized from methanol to give 8-methyl-11β-hydroxy-4-androstene-3,17-dione (174 mg.) as crystals melting at 228 to 230° C.

Example B

Preparation of 3,3,17,17 - bisethylenedioxy-8-methyl-5-androsten-11-one from 3,3,17,17 - bisethylenedioxy - 8- methyl-5-androsten-11β-ol: A solution of 3,3,17,17-bis-ethylenedioxy-8-methyl-5-androsten-11β-ol (3.014 g.) in anhydrous pyridine (30 ml.) is added to pyridine-chromic acid complex prepared from anhydrous pyridine (30 ml.) and chromic acid (3 g.) while cooling with ice, and the resultant mixture is allowed to stand at room temperature (15 to 30° C.) overnight. The reaction mixture is poured onto ice water and shaken with dichloromethane. The dichloromethane layer is washed with sodium carbonate and water, dried over anhydrous sodium sulfate and evaporated under reduced pressure. The oily residue (3.5 g.) is chromatographed on alumina (15 g.) and eluted with benzene-dichloromethane (2:1–1:1). The eluate is evaporated and crystallized from a mixture of dichloromethane and ether to give 3,3,17,17-bisethylenedioxy-8-methyl-5-androsten-11-one (2.736 g.) as crystals melting at 216 to 218° C.

Example C

Preparation of 8-methyl - 4 - androstene-3,11,17-trione from 3,3,17,17-bisethylenedioxy-8-methyl-5-androsten-11-one: To 3,3,17,17-bisethylenedioxy-8-methyl-5-androsten-11-one (30 mg.), there is added dioxane (1 ml.), water (0.5 ml.) and 60% perchloric acid (0.1 ml.), and the resultant mixture is allowed to stand at room temperature (15 to 30° C.) overnight. The reaction mixture is poured onto 2 N sodium carbonate while cooling with ice and shaken with dichloromethane. The dichloromethane layer is washed with water, dried over anhydrous sodium sulfate and evaporated under reduced pressure. The residue is crystallized from a mixture of acetone and ether to give 8-methyl-4-androstene-3,11,17-trione (15 mg.) as crystals melting at 198 to 200° C.

Example D

Preparation of 3,3,17,17-bisethylenedioxy-8-methyl-5-androstene from 3,3,17,17-bisethylenedioxy-8-methyl-5-androsten-11-one: To a mixture of anhydrous diethyleneglycol (60 ml.), metallic sodium (1.2 g.) and anhydrous hydrazine (7 ml.), there is added 3,3,17,17-bisethylenedioxy-8-methyl-5-androsten-11-one (2.4 g.), and the resultant mixture is refluxed overnight in nitrogen atmosphere. Then, the mixture is heated up to 210° C. for distilling out hydrazine and refluxed for 24 hours at the same temperature. After cooling, the reaction mixture is combined with ice-water and shaken with dichloromethane. The dichloromethane layer is washed with water, dried over anhydrous sodium sulfate and evaporated under reduced pressure. The oily residue is chromatographed on alumina (60 g.). The eluate with petroleum ether to petroleum ether-benzene (9:1) is evaporated and crystallized from ether to give 3,3-ethylenedioxy-8-methyl-5-androstene (236 mg.) as crystals melting at 153.5 to 154.5° C. The eluate with petroleum ether-benzene (9:1–2:1) is evaporated and crystallized from methanol to give 3,3,17,17-bisethylenedioxy-8-methyl-5-androstene (806 mg.) as crystals melting at 126 to 127° C.

Example E

Preparation of 8-methyl-4-androstene-3,17-dione from 3,3,17,17-bisethylenedioxy-8-methyl - 5 - androstene: To a solution of 3,3,17,17-bisethylenedioxy-8-methyl-5-androstene (1.2 g.) in a mixture of dioxane (50 ml.) and water (25 ml.), there is added 60% perchloric acid (1.8 ml.), and the resultant mixture is allowed to stand at room temperature (15 to 30° C.) overnight. The reaction mixture is combined with 2 N sodium carbonate while cooling with ice and shaken with dichloromethane. The dichloromethane layer is washed with water, dried over anhydrous sodium sulfate and evaporated under reduced pressure. The residue (940 mg.) is crystallized from a mixture of acetone and ether to give 8-methyl-4-androstene-3,17-dione (893 mg.) as crystals melting at 174 to 175.5° C.

Example F

Preparation of 3-ethoxy-8-methyl-3,5-androstadien-17-one 8-methyl-4-androstene-2,17-dione: A mixture of 8-methyl-4-androstene-3,17-dione (793 mg.), ethyl orthoformate (2 ml.), a mixture of anhydrous ethanol (2 ml.) and anhydrous benzene (28 ml.) is heated to reflux, and dry pyridine hydrochloride (60 mg.) is added thereto. The resultant mixture is refluxed on an oil bath for 30 minutes. After cooling, the reaction mixture is poured onto 2 N sodium carbonate and shaken with ether. The ether layer is washed with water, dried over anhydrous sodium sulfate and evaporated. The residue is crystallized from ethanol to give 3-ethoxy-8-methyl-3,5-androstadien-17-one (678 mg.) as crystals melting at 164 to 167° C.

Example G

Preparation of 3-ethoxy-8-methyl-3,5-androstadien-17β-ol from 3-ethoxy-8-methyl-3,5-androstadien-17-one: Lithium aluminum hydride (500 mg.) is added to a solution of 3-ethoxy-8-methyl-3,5-androstadien-17-one (678 mg.) in anhydrous ether (90 ml.) avoiding dampness while cooling with ice, and the resulting mixture is refluxed for 30 minutes under stirring. The reaction mixture is combined with water while cooling with ice to decompose excess of lithium aluminum hydride. The resultant mixture is shaken with ether. The ether layer is washed with water, dried over anhydrous sodium sulfate and evaporated under reduced pressure to give 3-ethoxy-8-methyl-3,5-androstadien-17β-ol (696 mg.) as crude crystals melting at 98 to 103° C.

Example H

Preparation of 8-methyl - 17β - hydroxy-4-androsten-3-one from 3-ethoxy-8-methyl-3,5-androstadien-17β-ol: To a solution of the crude 3-ethoxy-8-methyl-3,5-androstadien-17β-ol (696 mg.) obtained in Example G in a mixture of dioxane (30 ml.) and water (15 ml.), there is added 60% perchloric acid (1 ml), and the resultant mixture is allowed to stand at room temperature (15 to 30° C.) overnight. The reaction mixture is poured onto 2 N sodium carbonate while cooling with ice and shaken with dichloromethane. The dichloromethane layer is washed with water, dried over anhydrous sodium sulfate and evaporated. The residue is crystallized from a mixture of acetone and ether to give 8-methyl-17β-hydroxy-4-androsten-3-one (597 mg.) as crystals melting at 201 to 202.5° C.

Further, for instance, 8-methyl-5α-22-erogstene-3β,11β-diol prepared as in the above Example 1 can be converted into various 8-methylergostanes which are readily changed to the corresponding 8-methylandrostanes having anabolic activity by application of per se conventional procedures for degradation of a side chain at the 17-position. A route from 8-methyl-5α-22-ergostene-3β,11β-diol to some other 8-methylergostanes is shown in the following scheme:

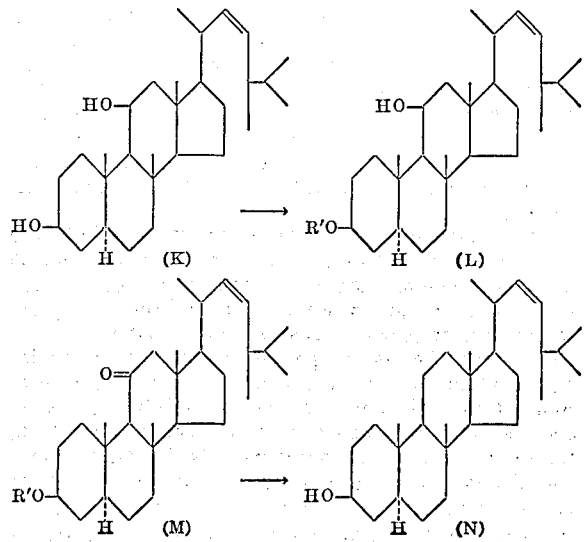

wherein R' is a lower alkanoyl group (e.g. acetyl, propionyl, butyryl, valeryl).

The above conversion will be hereinafter illustrated concretely by samples. In these examples, abbreviations each has the conventional meaning as above mentioned.

Example J

Preparation of 3β-acetyloxy-8-methyl-5α-22-ergostene-11β-ol from 8-methyl-5α-22-ergostene-3β,11β-diol: A solution of 8-methyl-5α-22-ergostene-3β,11β-diol (576 mg.) in a mixture of anhydrous pyridine (6 ml.) and acetic anhydride (3 ml.) is allowed to stand at room temperature (15 to 30° C.) for 18 hours. The reaction mixture is combined with ice-water and shaken with ether. The ether layer is washed with 2 N hydrochloric acid, water, 2 N sodium carbonate and water in order, dried over anhydrous sodium sulfate and evaporated under reduced pressure. The residue is crystallized from a mixture of dichloromethane and methanol to give 3β-acetyloxy-8-methyl-5α-22-ergosten-11β-ol (544 mg.) as crystals melting at 171 to 172° C.

Example K

Preparation of 3β-acetyloxy-8-methyl-5α-22-ergosten-11-one from 3β-acetyloxy-8-methyl-5α-22-ergosten-11β-ol: A solution of 3β-acetyloxy-8-methyl-5α-22-ergosten-11β-ol (310 mg.) in anhydrous pyridine (4.5 ml.) is added to a solution of chromic acid (310 mg.) in anhydrous pyridine (6 ml.), and the resultant mixture is allowed to stand at room temperature (15 to 30° C.) for 18 hours. The reaction mixture is poured onto ice-water and shaken with a mixture of ether and chloroform. The organic solvent layer is washed with 2 N sulfuric acid, water, 2 N sodium carbonate and water in order, dried over anhydrous sodium sulfate and evaporated under reduced pressure. The residue (316 mg.) is crystallized from methanol to give 3β-acetyloxy-8-methyl-5α-22-ergosten-11-one (213 mg.) as crystals melting at 178 to 179.5° C.

Example L

Preparation of 8-methyl-5α-22-ergosten-3β-ol from 3β-acetyloxy-8-methyl-5α-22-ergosten-11-one: To a mixture of diethyleneglycol (4 ml.) and metallic sodium (80 mg.) at 180° C., there is added hydrazine (0.5 ml.) in nitrogen atmosphere avoiding dampness. After cooling, 3β-acetyloxy-8-methyl-5α-22-ergosten-11-one (170 mg.) is added thereto, and the resultant mixture is heated at 180° C. for 19 hours. Then, the mixture is heated up to 210° C. and refluxed for 24 hours. After cooling, the reaction mixture is combined with water and shaken with chloroform. The chloroform layer is washed with 2 N hydrochloro acid, water, 2 N sodium carbonate and water in order, dried over anhydrous sodium sulfate and evaporated under reduced pressure. The residue is chromatographed on alumina. The eluate with benzene is evaporated and crystallized from a mixture of chloroform and methanol to give 8-methyl-5α-22-ergosten-3β-ol (56 mg.) as crystals melting at 160° C.

8-methyl-5α-22-ergosten-3β-ol obtained in Example L can be converted into 8-methylandrostanes being per se useful as anabolic agents, for instance, according to the following scheme:

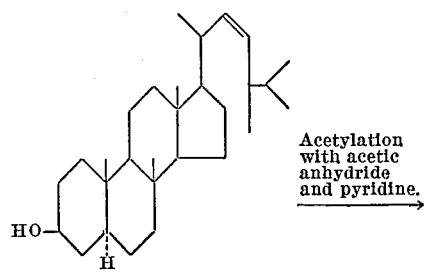

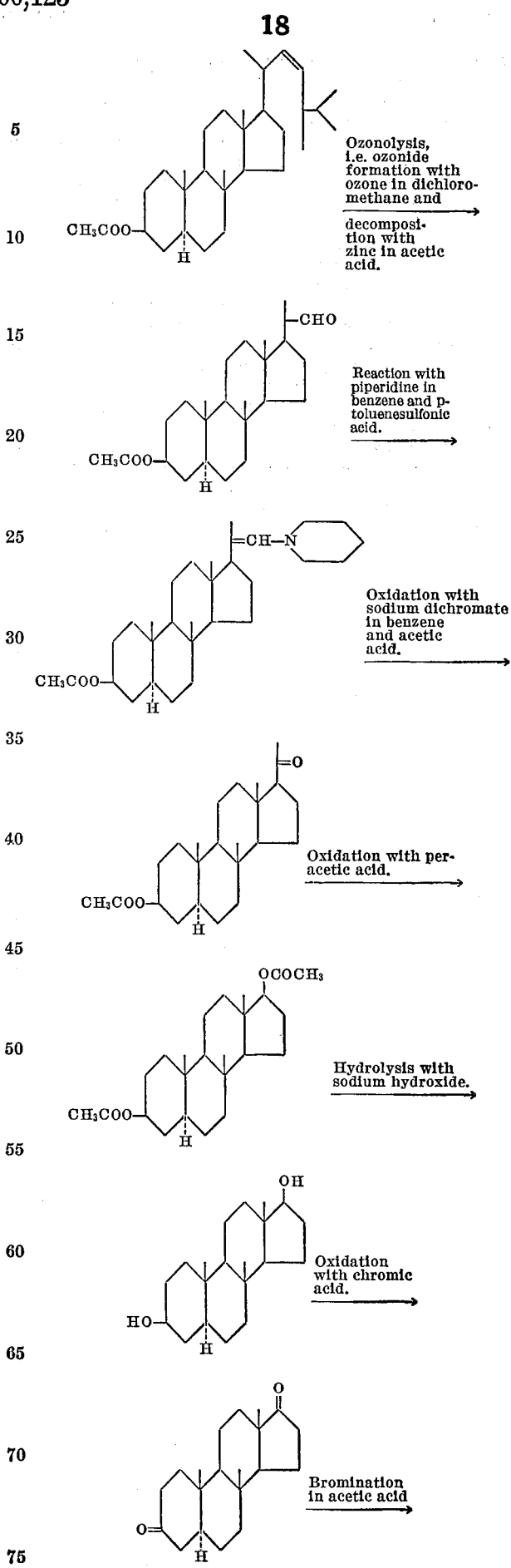

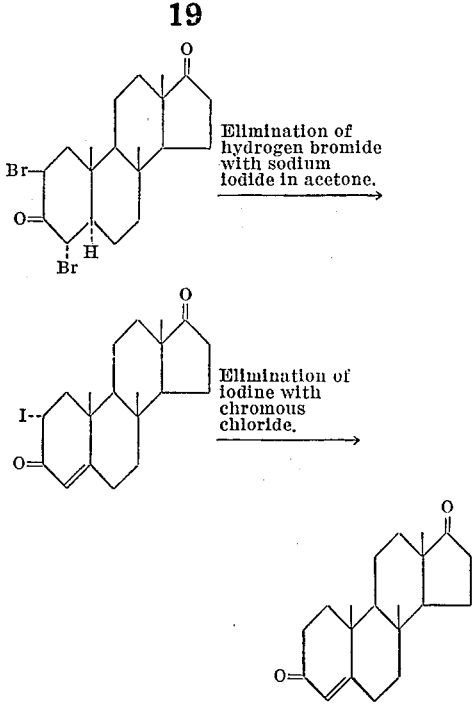

Elimination of hydrogen bromide with sodium iodide in acetone.

Elimination of iodine with chromous chloride.

It will be appreciated that various modifications can be made in the invention described above and such are within the scope of the present invention as defined in the appended claims.

What is claimed is:

1. In the fission of the lactone linkage of an 11β-hydroxyandrostane - 8β - carboimidic acid 8,11-lactone, the steps of first subjecting the 11β-hydroxyandrostane-8β-carboimidic acid 8,11-lactone to the action of an acylating agent selected from the group consisting of compounds of the formulae RCO.hal and $$\begin{array}{c} RCO \\ \phantom{RC}\diagdown \\ \phantom{RCOO}O \\ \phantom{RC}\diagup \\ RCO \end{array}$$

R being a member selected from the group consisting of lower alkyl, lower alkoxy, phenyl, phenoxy, tolyl and tolyloxy, and then converting the resultant N-actyl-11β-hydroxyandrostane - 8β - carboimidic acid 8,11-lactone to the corresponding 8β - iminomethyl - 11β - hydroxyandrostane by the action of a member selected from the group consisting of alkali metal and alkaline earth metal in liquid ammonia.

2. In the fission of the lactone linkage of an 11β-hydroxygostane-8β-carboimidic acid 8,11-lactone, the steps of first subjecting the 11β-hydroxyergostane - 8β - carboimidic acid, 8,11-lactone to the action of an acylating agent selected from the group consisting of compounds of the formulae RCO.hal and $$\begin{array}{c} RCO \\ \phantom{RC}\diagdown \\ \phantom{RCOO}O \\ \phantom{RC}\diagup \\ RCO \end{array}$$

R being a member selected from the group consisting of lower alkyl, lower alkoxy, phenyl, phenoxy, tolyl and tolyloxy, and then converting the resultant N-acyl-11β-hydroxyergostane-8β-carboimidic acid 8,11-lactone to the corresponding 8β-iminomethyl-11β-hydroxyergostane by the action of a member selected from the group consisting of alkali metal and alkaline earth metal in liquid ammonia.

3. A process according to claim 1, wherein the acylating agent is lower alkanoic anhydride in organic base, and wherein the last-mentioned converting step is carried out in the presence of lower alkanol.

4. A process according to claim 2, wherein the acylating agent is lower alkanoic anhydride in organic base, and wherein the last-mentioned converting step is carried out in the presence of lower alkanol.

5. A process according to claim 1, wherein the acylating agent is lower alkoxycarbonyl halide in organic base, and wherein the last-mentioned converting step is followed by hydrolysis with a hydrolyzing agent.

6. A process according to claim 2, wherein the acylating agent is lower alkoxycarbonyl halide in organic base, and wherein the last-mentioned converting step is followed by hydrolysis with a hydrolyzing agent.

7. 3β,11β-dihydroxy-5α-22 - ergostene - 8 - carboimidic acid 8,11-lactone.

8. N-lower alkanoyl - 3β - lower alkanoyloxy - 11β-hydroxy-5α-22-ergostene-8-carboimidic acid 8,11-lactone.

9. A compound according to claim 8, said compound being N-acetyl-3β-acetyloxy-11β-hydroxy-5α-22-ergostene-8-carboimidic acid 8,11-lactone.

10. 8-iminomethyl-5α-22-ergostene-3β,11β-diol.

11. 3β,11β-dihydroxy-5α - 22 - ergostene-8-carboxaldehyde.

12. 8-methyl-5α-22-ergostene-3β,11β-diol.

13. 3β-lower alkanoyloxy - 8 - methyl-5α-22-ergostene-11β-ol.

14. A compound according to claim 13, said compound being the 3β-acetyloxy-8-methyl-5α-22-ergosten-11β-ol.

15. 3β-lower alkanoyloxy-8-methyl - 5α-22-ergosten-11-one.

16. A compound according to claim 15, said compound being the 3β-acetyloxy-8-methyl-5α-22-ergosten-11-one.

17. 8-methyl-5-α-22-ergosten-3β-ol.

18. 3,3,17,17-bisethylenedioxy - 11β - hydroxy-5-androstene-8-carboimidic acid 8,11-lactone.

19. 3,3,17,17 - bisethylenedioxy - N - lower alkoxycarbonyl-11β-hydroxy-5-androstene-8-carboimidic acid 8,11-lactone.

20. A compound according to claim 19, said compound being the 3,3,17,17-bisethylenedioxy - N - ethoxycarbonyl-11β-hydroxy-5-androstene - 8 - carboimidic acid 8,11-lactone.

21. 3,3,17,17 - bisethylenedioxy-N-lower alkanoyl-11β-hydroxy-5-androstene-8-carboimidic acid 8,11-lactone.

22. A compound according to claim 21, said compound being the 3,3,17,17 - bisethylenedioxy - N - acetyl-11β-hydroxy-5-androstene-8-carboimidic acid 8,11-lactone.

23. 3,3,17,17 - bisethylenedioxy - 8 - iminomethyl-5-androsten-11β-ol.

24. 3,3,17,17-bisethylenedioxy - 11β - hydroxy-5-androstene-8-carboxaldehyde.

25. 3,3,17,17 - bisethylenedioxy-8-methyl-5-androsten-11β-ol.

26. 8-methyl-17β-hydroxy-4-androsten-3-one.

References Cited

Bernstein et al.: "Journ. Org. Chem." (1953) vol. 18, p. 1166 relied on.

Caspi et al.: "Journ. Chem. Society" (1962), pp. 1710–1716 relied on.

Caspi et al.: "Journ. Org. Chem." March 1963, vol. 28, p. 765 relied on.

Ercoli et al., "J. Amer. Chem. Soc." (1953), vol. 75, p. 650 relied on.

Herzog et al.: "Jour. Amer. Chem. Soc." (1953), vol. 75, p. 4425 relied on.

Nussbaum et al.: "Jour. Org. Chem." (1961), vol. 26, p. 3925 relied on.

ELBERT L. ROBERTS, *Primary Examiner.*